(No Model.)
S. HUBBELL.
FOLDING BICYCLE FRAME.
No. 561,665.            Patented June 9, 1896.
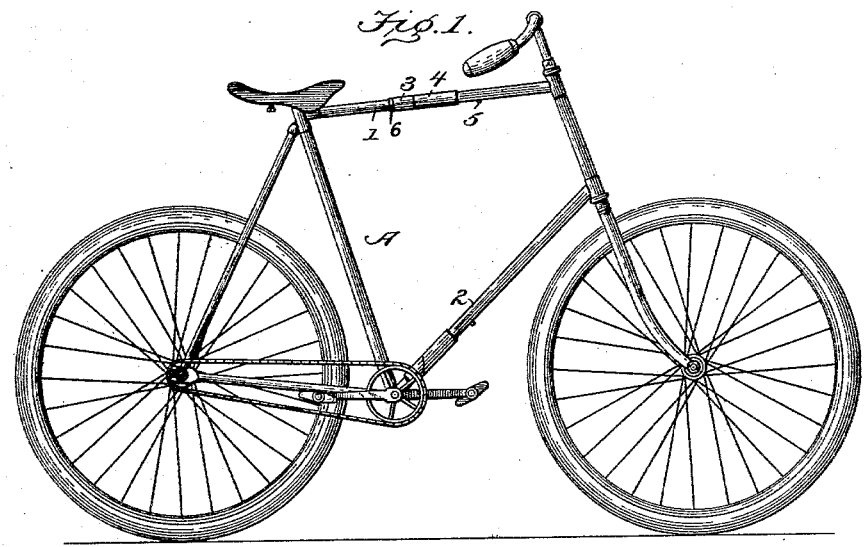
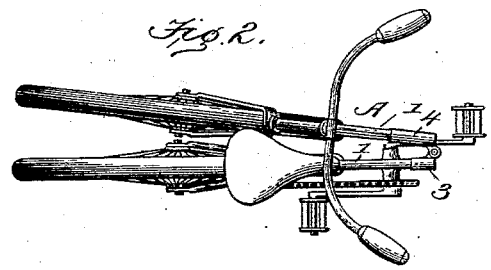
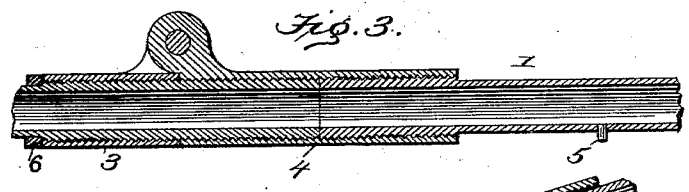
WITNESSES:
Edwin L. Bradford
Benj. Simons.
INVENTOR
Silas Hubbell
BY
V. D. Stockbridge & Son.
his ATTORNEYS.

UNITED STATES PATENT OFFICE.

SILAS HUBBELL, OF SYRACUSE, NEW YORK.

FOLDING BICYCLE-FRAME.

SPECIFICATION forming part of Letters Patent No. 561,665, dated June 9, 1896.

Application filed July 9, 1895. Serial No. 555,387. (No model.)

*To all whom it may concern:*

Be it known that I, SILAS HUBBELL, a citizen of the United States, residing at Syracuse, in the county of Onondaga and State of New York, have invented certain new and useful Improvements in Folding Bicycle-Frames; and I do hereby declare the following to be a full, clear, and exact description of the invention, such as will enable others skilled in the art to which it appertains to make and use the same.

My invention is an improvement in folding frames for bicycles, the object being to provide a frame whereby the bicycle may be doubled or folded to bring the wheels alongside of and contiguous to each other to bring the machine into compact shape for convenient storage and transportation.

The invention consists in the combination of a bisected frame and a coupling or union composed of a two-part sleeve, the parts of which are jointed or hinged together. This coupling is obviously adapted to all folding frames made of cylindrical or tubular bars.

In the drawings forming a part of this specification, Figure 1 is a side elevation of a bicycle having a diamond frame with my improvements applied thereto. Fig. 2 is a plan showing the machine folded for compact storage or convenient transportation, a portion of the upper bar and its coupling being in section. Fig. 3 is a section of a segment of one of the bars when the parts of the frame are coupled for use.

A is an ordinary diamond frame of a bicycle, 1 being the upper bar and 2 the lower bar thereof. The bars 1 and 2 are bisected, as shown, so that they will articulate about the same vertical axis and so that when folded the wheels will come side by side, as shown in Fig. 2.

3 and 4 are the parts of a two-part sleeve or union for the parts of the frame-bar. The abutting ends of the frame-bars are preferably reinforced and screw-threaded, and the parts of the union are likewise screw-threaded to interlock with the parts of the frame-bar.

The part 3 of the coupling may be and usually is relatively short and serves as a movable collar for connecting the union part 4 with its part of the frame-bar. The part 4 constitutes the conventional union for the two-part bar. That part of the bar upon which the union 4 is mounted is provided with a collar or other stop 5 to limit or gage the traverse of said union when it is moved to permit the frame to be folded. A similar stop 6 may be provided on the bar to limit the rearward movement of the part 3.

To adjust the frame for use, the union-coupling 3 4 is screwed into position, as shown in Fig. 3, and to prepare for folding, said coupling is moved to the position shown in Fig. 2, so that part 4 abuts against stop 5, when the abutting ends of the frame-bars coincide with the abutting parts of the coupling.

Obviously a sleeve without screw-threads may be made to serve the purpose of my improved coupling; but I prefer the form of the invention which is illustrated in the drawings.

Having now described my invention, what I claim is—

1. A folding bicycle-frame involving the combination of one or more bisected frame-bars and a union composed of a two-part coupling-sleeve, the parts of said sleeve being jointed or hinged together and arranged to slide on the frame-bars to lock the frame together, substantially as described.

2. A union or coupling for a folding structure consisting of two screw-threaded sleeve-sections, arranged end to end as described, jointed together by a hinge outside the tube.

3. The combination of a union consisting of a two-part coupling-sleeve jointed or hinged together and a bisected frame having a collar or stop to gage or limit the movement of the union, the sleeve being arranged to slide on the frame-bars substantially as described.

In testimony whereof I affix my signature in presence of two witnesses.

SILAS HUBBELL.

Witnesses:
   H. AMENZO DYGERT,
   F. H. FOX.